(12) United States Patent
Yamashita

(10) Patent No.: US 7,245,303 B2
(45) Date of Patent: Jul. 17, 2007

(54) IMAGE PROCESSING APPARATUS

(75) Inventor: Yujiro Yamashita, Kanagawa (JP)

(73) Assignee: Sony Corporation (JP)

( * ) Notice: Subject to any disclaimer, the term of this patent is extended or adjusted under 35 U.S.C. 154(b) by 63 days.

(21) Appl. No.: 10/277,869

(22) Filed: Oct. 23, 2002

(65) Prior Publication Data

US 2003/0117404 A1 Jun. 26, 2003

(30) Foreign Application Priority Data

Oct. 26, 2001 (JP) ............................ P2001-328958

(51) Int. Cl.
*G09G 5/39* (2006.01)
*G06T 1/60* (2006.01)
*G06F 13/00* (2006.01)

(52) U.S. Cl. ....................... 345/531; 345/530; 345/537

(58) Field of Classification Search ................ 345/531, 345/537, 536, 544, 419, 418, 606, 582, 534, 345/501, 543, 538
See application file for complete search history.

(56) References Cited

U.S. PATENT DOCUMENTS

| | | | | |
|---|---|---|---|---|
| 5,175,811 A * | 12/1992 | Sone et al. | ................. | 345/469 |
| 5,559,953 A * | 9/1996 | Seiler et al. | ................. | 345/543 |
| 5,579,473 A * | 11/1996 | Schlapp et al. | ............. | 345/557 |
| 5,790,130 A | 8/1998 | Gannett | | |
| 5,828,382 A | 10/1998 | Wilde | | |
| 5,850,483 A * | 12/1998 | Takabatake et al. | ........ | 382/233 |
| 5,889,526 A * | 3/1999 | Hashimoto | ................... | 345/582 |
| 5,999,199 A | 12/1999 | Larson | | |
| 6,144,392 A | 11/2000 | Rogers | | |
| 6,204,863 B1 | 3/2001 | Wilde | | |
| 6,233,647 B1 | 5/2001 | Bentz et al. | | |
| 6,414,687 B1 * | 7/2002 | Gibson | ....................... | 345/503 |
| 2001/0011326 A1* | 8/2001 | Yoshikawa et al. | ......... | 711/119 |
| 2002/0101435 A1* | 8/2002 | Sasaki et al. | ............... | 345/611 |

OTHER PUBLICATIONS

EPO Search Report Mailed Nov. 8, 2005.
Michael Cox, Multi-Level Texture Caching For 3D Graphics Hardware IEEE 1998.
Computer Graphics & Geometric Modeling, David Salomon, 1999.

* cited by examiner

*Primary Examiner*—Kee M. Tung
*Assistant Examiner*—Joni Hsu
(74) *Attorney, Agent, or Firm*—Rader Fishman & Grauer PLLC; Ronald P. Kananen

(57) ABSTRACT

The present invention is directed to an image processing apparatus for achieving an increase of capacity and an improvement in processing capability without causing a drop in performance and an increase in cost. The apparatus includes built-in memory, external memory, and a memory interface (I/F) circuit. The external memory is divided into a plurality of blocks that store predetermined data. The built in memory is accommodated on the semiconductor chip and is divided into blocks having the same capacity as a divided block of the external memory. The memory I/F circuit displaces data stored in the built-in memory with data stored in the external memory based on a displacement command.

4 Claims, 12 Drawing Sheets

FIG.3

| MEMORY AREA MA1 | BUILT-IN MEMORY 147 |
|---|---|
| MEMORY AREA MA2 | EXTERNAL MEMORY 15 |

FIG.4A

| AREA01 | DATA0A |
|--------|--------|
| AREA02 | DATA0B |
| AREA03 | DATA0C |
| AREA04 | DATA0D |

FIG.4B

| AREA11 | DATA1A |
|--------|--------|
| AREA12 | DATA1B |
| AREA13 | DATA1C |
| AREA14 | DATA1D |
| AREA15 | DATA1E |
| AREA16 | DATA1F |
| AREA17 | DATA1G |
| AREA18 | DATA1H |

FIG.5A

| AREA01 | DATA0A |
|--------|--------|
| AREA02 | DATA1E |
| AREA03 | DATA0C |
| AREA04 | DATA0D |

FIG.5B

| AREA11 | DATA1A |
|--------|--------|
| AREA12 | DATA1B |
| AREA13 | DATA1C |
| AREA14 | DATA1D |
| AREA15 | DATA1E |
| AREA16 | DATA1F |
| AREA17 | DATA1G |
| AREA18 | DATA1H |

MAKE SIDE EXTENDING LONGEST IN Y DIRECTION SIDE AC

FIG.8
TRIANGLES CAN BE DIVIDED IN THREE WAYS
THERE IS ONE UPPERMOST VERTEX AND CONTINUING SIDE IS ON LEFT SIDE
UPPER SIDE IS HORIZONTAL (LEFT SIDE BECOMES BASE)
THERE IS ONE UPPERMOST VERTEX AND CONTINUING SIDE IS ON RIGHT SIDE
RIGHT SIDE MAY BE BASE IN THESE CASES
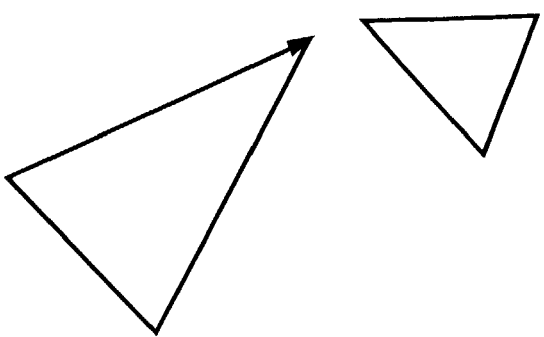
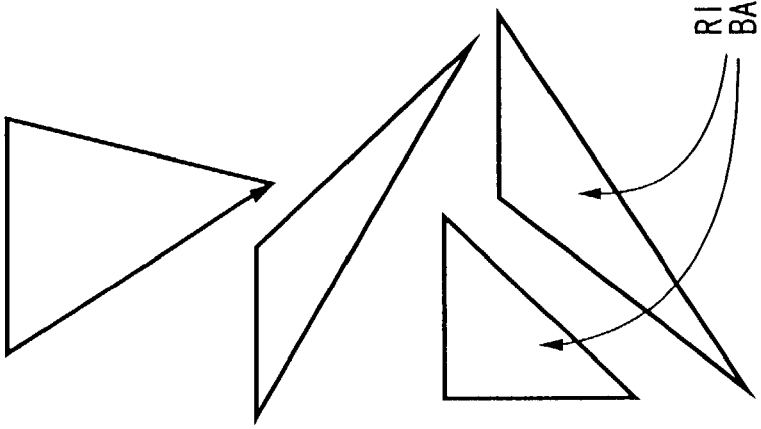
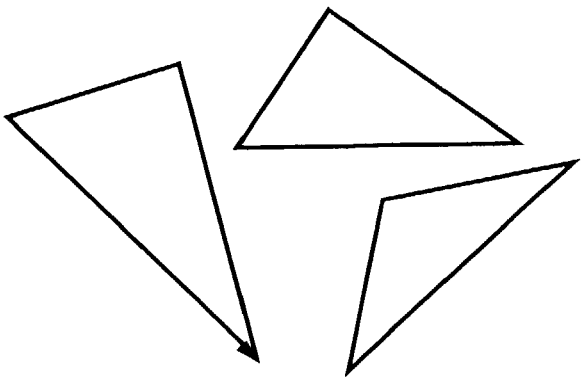

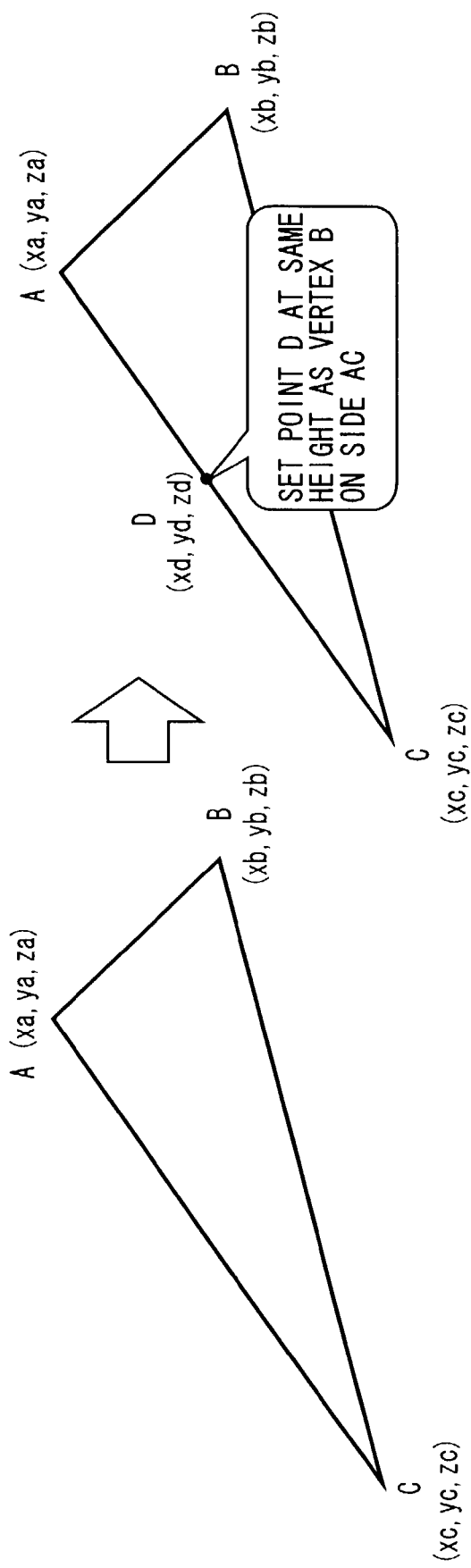

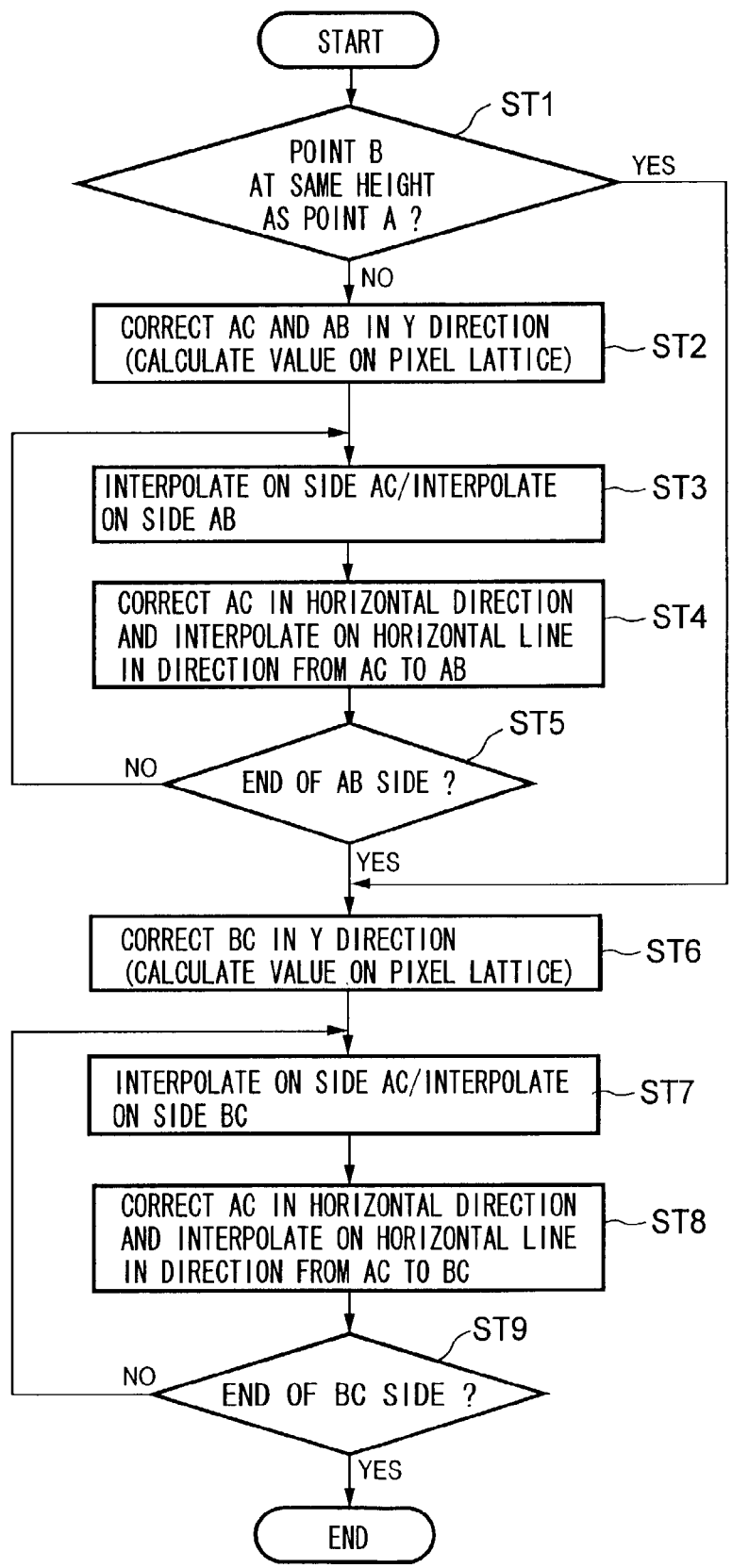

IMAGE PROCESSING APPARATUS

BACKGROUND OF THE INVENTION

1. Field of the Invention

The present invention relates to a graphics drawing image processing apparatus and more particularly, relates to technology for accessing a built-in memory and external memory when combining a dynamic random access memory (DRAM) or other memory requiring refreshing and a logic circuit and further providing an external memory.

2. Description of the Related Art

Computer graphics are often used in a variety of computer aided design (CAD) system and amusement apparatuses. Especially, along with recent advances in image processing techniques, systems using three-dimensional computer graphics are becoming rapidly widespread.

In three-dimensional computer graphics, the color value of each pixel is calculated at the time of deciding the color of each corresponding pixel, and rendering is performed for writing the calculated value of the pixel to an address of a display buffer (frame buffer) corresponding to the pixel.

One of the rendering methods is polygon rendering. In this method, a three-dimensional model is expressed as a composite of triangular unit graphics (polygons). By drawing the polygons as units, the colors of the display screen are decided.

In polygon rendering, coordinates (x, y, z), color data (R, G, B), homogeneous coordinates (s, t) of texture data indicating a composite image pattern, and a value of the homogeneous term q for each vertex of the triangle in a physical coordinate system are input and processing is performed for interpolation of these values inside the triangle.

Here, looking at the homogeneous term q, the coordinates in a UV coordinate system of an actual texture buffer, namely, texture coordinate data (u, v), are comprised of the homogeneous coordinates (s, t) divided by the homogeneous term q to give "s/q" and "t/q", which in turn are multiplied by texture sizes USIZE and VSIZE, respectively.

FIG. 12 is a view of the system configuration showing the basic concept of a three-dimensional computer graphics system.

In this three-dimensional computer graphics system, data for drawing graphics is supplied from a main memory 2 in a main processor 1 or from an input/output (I/O) interface circuit 3 for receiving graphics data from the outside via a main bus 4 to a rendering circuit 5 having a rendering processor 5a and a frame buffer memory 5b.

In the rendering processor 5a, a frame buffer memory 5b for holding data for display and a texture memory 6 for holding texture data to be applied on the surface of a graphic element (for example, a triangle) to be drawn are connected.

Then, by the rendering processor 5a, processing for drawing the graphic element applied with the texture on its surface for every graphic element in the frame buffer memory 5b is performed.

The frame buffer memory 5b and the texture memory 6 are generally configured by a DRAM.

Then, in the system of FIG. 12, the frame buffer memory 5b and the texture memory 6 are configured as physically separated memory systems.

In a graphics drawing image processing apparatus, however, the memory is frequently accessed, such as for writing and reading image data to and from the memory and for reading for display of the image. Further, it becomes necessary to secure a wide bus width of the memory to obtain the full graphics drawing performance.

As a result, it has become physically impossible to arrange separately the graphics drawing image processing apparatus and memory due to the increase of the number of interconnections, so the DRAM and the logic circuit began to be provided on one chip.

Summarizing the problems to be solved by the invention, as mentioned above, in a graphics drawing image processing apparatus, it became easy to secure the bus width by arranging the memory inside the LSI.

However, it is necessary to make the built-in DRAM larger in capacity to improve the performance, but the enlargement of the capacity is difficult in actuality due to restrictions on the size of the chip.

In this case, the memory is frequently accessed for being rewritten from the outside due to the shortage of the memory capacity. This exerts a large influence upon the performance.

Also, reconnection of the external memory can be considered in order to achieve enlargement of the capacity, but simple expansion causes the disadvantage that the processing speed and the latency (reaction speed) become slow.

SUMMARY OF THE INVENTION

An object of the present invention is to provide an image processing apparatus capable of achieving an increase of capacity and, accordingly, capable of achieving an improvement of the processing capability without causing a drop in performance or an increase of costs.

To attain the above object, according to a first aspect of the present invention, there is provided an image processing apparatus comprising at least a built-in memory for storing image data, an external memory for storing data regarding the image, a logic circuit provided on the same semiconductor chip as the built-in memory and performing predetermined processing on the image data based on the stored data of the built-in memory and/or external memory, and a memory interface circuit for controlling access of data between the built-in memory and external memory and the logic circuit.

According to a second aspect of the present invention, there is provided an image processing apparatus for performing rendering by receiving polygon rendering data including three-dimensional coordinates (x, y, z), R (Red), G (Green), and B (Blue) data, homogeneous coordinates (s, t) of texture, and a homogeneous term q for vertexes of a unit graphic, comprising; a built-in memory for storing display data and texture data required by at least one graphic element; a logic circuit provided with at least an interpolated data generation circuit for interpolating the polygon rendering data of the vertexes of the unit graphic to generate interpolated data of pixels positioned inside the unit graphic and a texture processing circuit for dividing the homogeneous coordinates (s, t) of texture included in the interpolated data by the homogeneous term q to generate "s/q" and "t/q", reading texture data by using a texture address corresponding to the "s/q" and "t/q", and performing processing to apply the texture data to a surface of graphic elements of the display data and accommodated with the built-in memory on a single semiconductor chip; an external memory for storing at least the data regarding the texture processing; and a memory interface circuit for controlling the access of the data between the built-in memory and external memory and the logic circuit.

Further, in the present invention, the built-in memory stores the data having high access frequency, and the memory interface circuit accesses the stored data of the built-in memory prior to the stored data of the external memory and supplies the data to the logic circuit.

Further, in the present invention, the capacity of the external memory is larger than the capacity of the built-in memory, the memory area of the external memory is divided into a plurality of blocks, predetermined data is stored in individual blocks, the memory area of the built-in memory is divided into blocks each having the same capacity as a divided block of the external memory, and the memory interface circuit accesses the data stored in each divided block in the built-in memory, supplies the data to the logic circuit and further receives a displacement command and displaces data which become unnecessary among the data stored in the built-in memory with the data needed next stored in the predetermined blocks of the external memory.

According to the present invention, for example, the built-in memory stores data regarding an image having a high access frequency, while the external memory stores data having a low access frequency. Accordingly, in normal image processing, the memory interface circuit frequently accesses the built-in memory and accesses the external memory in accordance with need.

As a result, it is possible to provide an external memory to increase greatly the capacity and also to exhibit sufficiently the advantages of a built-in memory, such as a fast processing speed and a fast reaction speed.

Further, according to the present invention, the capacity of the external memory is set larger than the capacity of the built-in memory.

The memory area of the external memory is divided into a plurality of blocks and the predetermined data is stored in individual blocks.

Similarly, the memory area of the built-in memory is divided into blocks each having the same capacity as that of a divided block of the external memory.

Then, when certain data stored in the built-in memory become unnecessary, and a displacement command is issued to the memory interface circuit, the data which become unnecessary among the data stored in the built-in memory are displaced with the data needed next stored in a predetermined block of the external memory.

Then, the data which become necessary newly stored in the built-in memory are accessed by the memory interface circuit and supplied to the block circuit.

As a result, it is possible to provide an external memory to increase greatly the capacity and also to exhibit sufficiently the advantages of a built-in memory, such as a fast processing speed and reaction speed.

BRIEF DESCRIPTION OF THE DRAWINGS

These and other objects and features of the present invention will become clearer from the following description of the preferred embodiments given with reference to the attached drawings, wherein:

FIG. 3 is a view for explaining a first method of usage of an external memory and a built-in memory;

FIGS. 4A and 4B are views for explaining a second method of usage of the external memory and the built-in memory;

FIGS. 5A and 5B are views for explaining the second method of usage of the external memory and the built-in memory;

FIG. 8 is a view for explaining the sorting of vertexes of the triangle DDA circuit according to the present invention;

FIG. 9 is a view for explaining the processing for calculation of a gradient in the horizontal direction of the triangle DDA circuit according to the present invention;

FIG. 11 is a flow chart for explaining a routine for interpolation of vertex data of the triangle DDA circuit according to the present invention.

DESCRIPTION OF THE PREFERRED EMBODIMENTS

Below, in the present embodiment, an explanation will be made of a three-dimensional computer graphics system for displaying a desired three-dimensional image of any three-dimensional object model at a high speed on a cathode ray tube (CRT) or other display that is often applied in personal computers etc.

Figure 1:
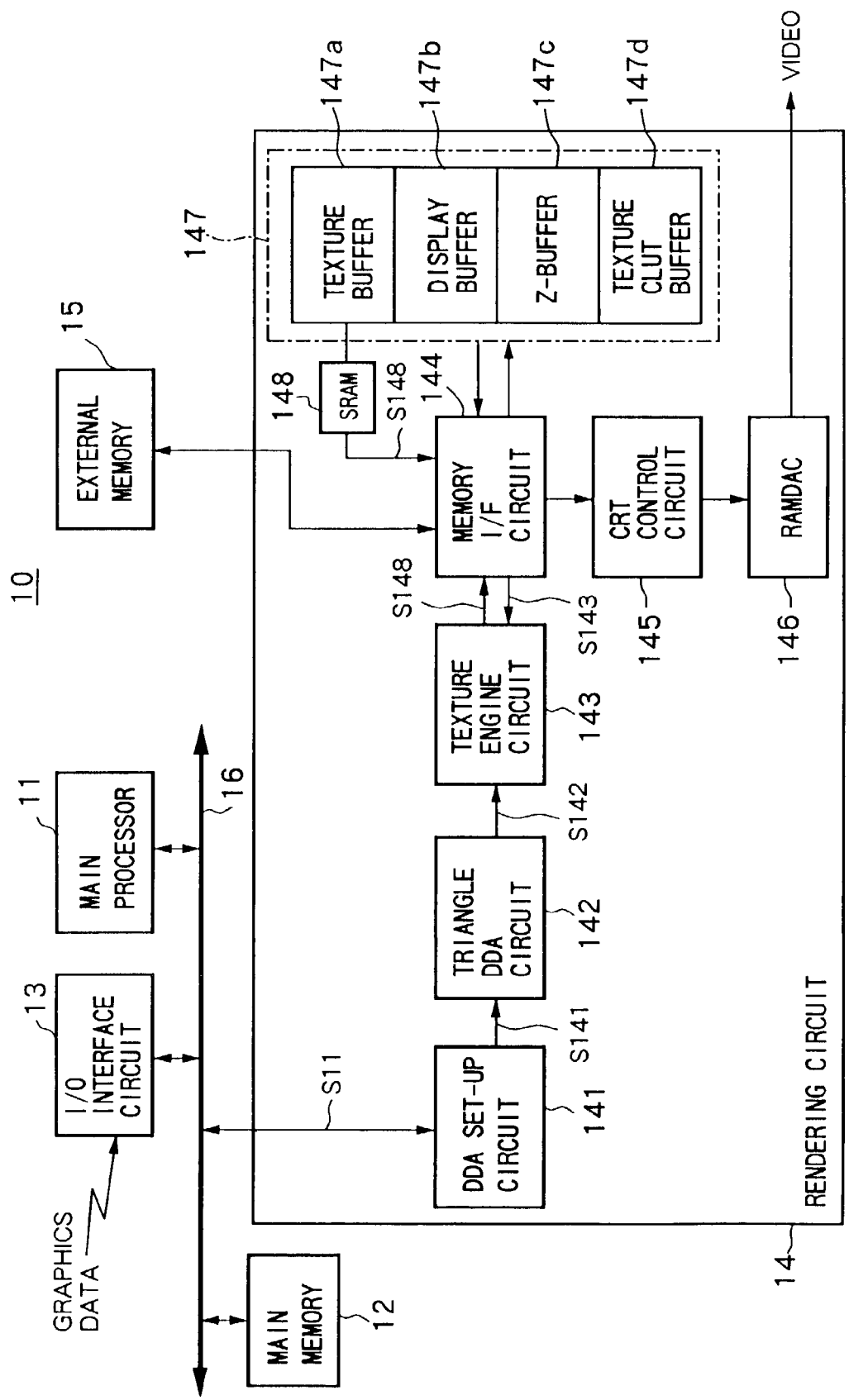
FIG. 1 is a block diagram of the configuration of a three-dimensional computer graphics system according to the present invention.

FIG. 1 is a view of the system configuration of a three-dimensional computer graphics system 10 as an image processing apparatus according to the present invention.

The three-dimensional computer graphics system 10 expresses a three-dimensional model as a composite of triangular unit graphics (polygons). By drawing the polygons, the colors of the pixels of the display screen are decided and polygon rendering for display on the display is performed.

Further, in the three-dimensional computer graphics system 10, a three-dimensional object is expressed by using a z-coordinate indicating depth in addition to the coordinates (x, y) indicating a position on a plane. The three coordinates (x, y, z) specify any one point in a three-dimensional space.

As shown in FIG. 1, the three-dimensional computer graphics system 10 has a main processor 11, a main memory 12, an I/O interface circuit 13, a rendering circuit 14, and an external memory 15.

The main processor 11, the main memory 12, the I/O interface circuit 13, and the rendering circuit 14 are connected via a main bus 16.

Below, the functions of the components will be explained.

The main processor 11 reads the necessary graphics data from the main memory 12 in accordance with, for example, the state of progress of an application and performs clipping, lighting, geometric processing, and the like on the graphics data and generates polygon rendering data. The main processor 11 outputs the polygon rendering data S11 to the rendering circuit 14 via the main bus 16.

The I/O interface circuit 13 receives as input the motion control information or the polygon rendering data from the outside in accordance with need and outputs the same to the rendering circuit 14 via the main bus 16.

Here, the polygon rendering data includes the data (x, y, z, R, G, B, s, t, q) of each of the three vertexes of the polygon.

Here, the (x, y, z) data indicates the three-dimensional coordinates of a vertex of the polygon, and the (R, G, B) data indicates the luminance values of red, green, and blue at the three-dimensional coordinates, respectively.

Among the (s, t, q) data, the (s, t) data indicates homogeneous coordinates of a corresponding texture and the q indicates a homogeneous term. Here, the texture sizes USIZE and VSIZE are respectively multiplied with the "s/q" and "t/q" to obtain the texture coordinate data (u, v). Access to the texture data stored in the texture buffer is performed by using the texture coordinate data (u, v).

Namely, the polygon rendering data comprises physical coordinate values of the vertexes of a triangle and colors and texture data of each of the vertexes.

Below, a rendering circuit 14 combining a logic circuit and a DRAM are provided together and further accessing to the external memory 15 will be explained in detail.

As shown in FIG. 1, the rendering circuit 14 comprises a digital differential analyzer (DDA) set-up circuit 141, a triangle DDA circuit 142, a texture engine circuit 143, a memory interface (I/F) circuit 144 including a function as a refresh circuit, a CRT control circuit 145, a RAMDAC circuit 146, a DRAM 147, and a static RAM (SRAM) 148.

The rendering circuit 14 in the present embodiment is provided with a logic circuit and a DRAM 147 for storing at least display data and texture data in one semiconductor chip.

In the present embodiment, the configuration of the DRAM 147 and the function of the memory I/F circuit 144 including the access control of the DRAM 147 and the external memory 15 will be explained first. Then, the functions of the DDA set-up circuit 141, the triangle DDA circuit 142, the texture engine circuit 143, the CRT control circuit 145, and the RAMDAC circuit 146 will be explained in that order.

DRAM 147

The DRAM 147 functions as a texture buffer 147a, a display buffer 147b, a z-buffer 147c, and a texture color look-up table (CLUT) buffer 147d.

Further, the DRAM 147 is divided into a plurality of modules (4 or 8 etc.) having identical functions.

Figure 2:
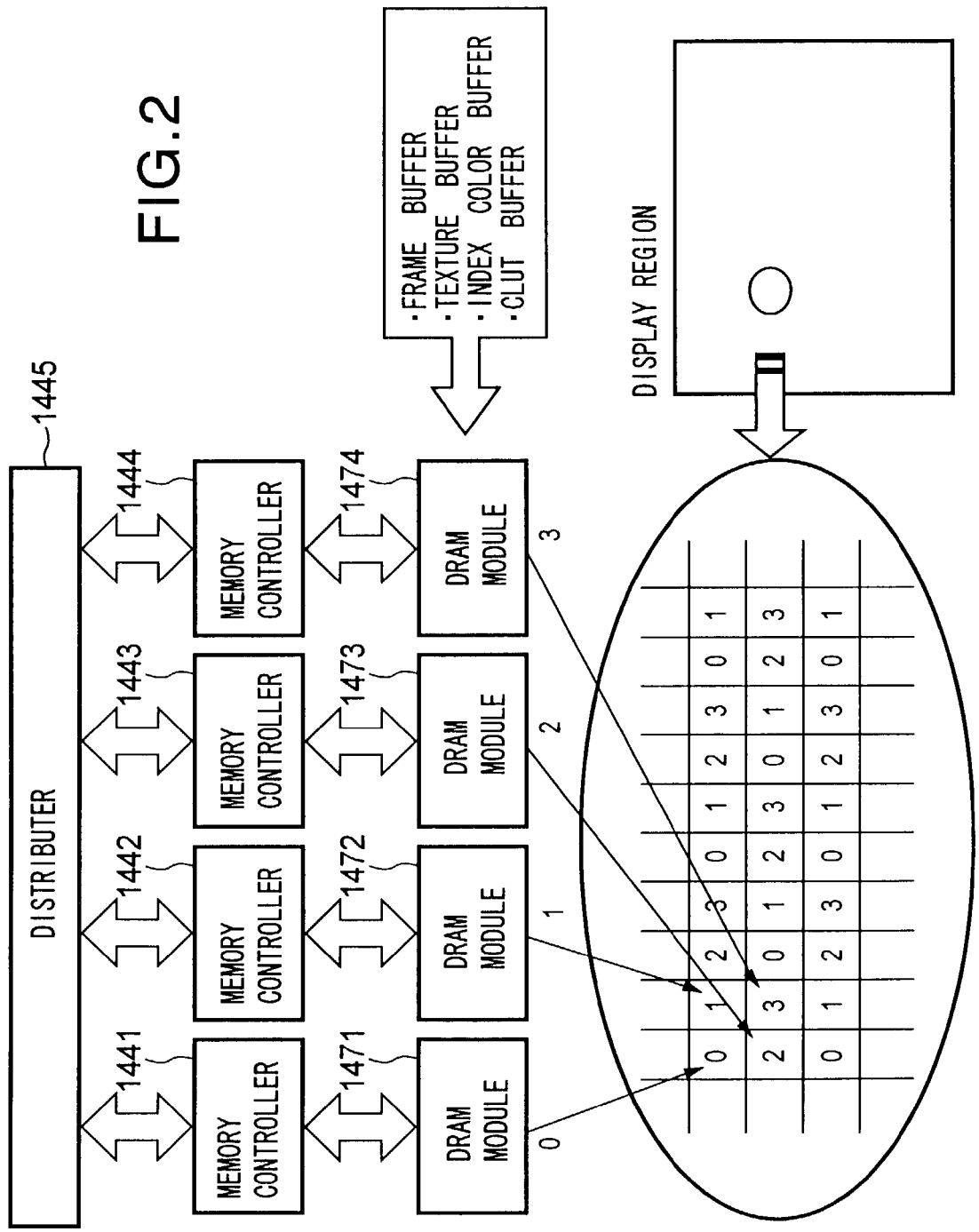
FIG. 2 is a view for explaining a data storing method according to the present invention.

In the present embodiment, the DRAM 147 is, for example, as shown in FIG. 2, divided into four DRAM modules 1471 to 1474. Each of the DRAM modules 1471 to 1474 has, for example, 512 page addresses (line addresses).

The memory I/F circuit 144 is provided with memory controllers 1441 to 1444 corresponding to the DRAM modules 1471 to 1474 and a distributer 1445 for distributing data to the memory controllers 1441 to 1444.

The memory I/F circuit 144 arranges the pixel data in the DRAM modules 1471 to 1474 so that adjacent portions in a display region are stored in different DRAM modules, as shown in FIG. 2.

As a result, it becomes possible to perform processing on a plane simultaneously when drawing a plane such as a triangle, so the probability of operation of the DRAM modules becomes very high.

Further, in order to store more texture data, the DRAM 147 stores indexes in index colors and color look-up table values for the same in the texture CLUT buffer 147d.

The indexes and color look-up table values are used for texture processing. Namely, a texture element is normally expressed by the total 24 bits of the 8 bits of each R, G, and B. With this, however, the amount of data swells, so one color is selected from, for example, 256 colors selected in advance and those data are used for the texture processing.

As a result, with 256 colors, the texture elements can be expressed by 8 bits. A conversion table from the indexes to an actual color is necessary; however, the higher the resolution of the texture, the more compact the texture data can become.

Due to this, compression of the texture data becomes possible and the built-in DRAM 147 can be used efficiently.

Further, depth information of the object to be drawn is stored in the DRAM 147 in order to perform hidden plane processing simultaneously and in parallel with the drawing.

Note that, as a method of storing the display data, the depth data, and the texture data, for example, the display data are stored continuously from the top of the memory block, then the depth data are stored, and then the texture data are stored in continuous address spaces for each type of texture in the remaining vacant region. As a result, the texture data can be stored efficiently.

Also, the graphics drawing processing is finally reduced to accesses of the individual pixels. Accordingly, ideally, the processings of the individual pixels are simultaneously processed in parallel, whereby the graphics drawing performance can be increased by exactly the number of parallel processings.

To attain the above, a configuration capable of simultaneous parallel processing is adopted in the memory I/F circuit 144 constituting the memory system in the present three-dimensional computer graphics system as well.

Memory I/F Circuit 144

The memory I/F circuit 144 compares the z-data corresponding to the pixel data S143 input from the texture engine circuit 143 with the z-data stored in the z-buffer 147c, judges whether the image drawn by the input pixel data S143 is positioned closer to the viewing point than the image written in the display buffer 147b the previous time, and, when judging that is positioned closer, updates the z-data stored in the z-buffer 147c by the z-data corresponding to the image data S143.

Further, the memory I/F circuit 144 writes (inputs) (R, G, B) data to the display buffer 147b.

Note that the memory I/F circuit 144 accesses the DRAM 147 for 16 pixels simultaneously.

Further, the memory I/F circuit 144 accesses the external memory 15 in parallel to the access to the built-in DRAM 147.

For example, the external memory 15 comprising the DRAM is used as the interpolative memory of the built-in DRAM 147 and has, for example, texture data stored therein.

The memory I/F circuit 144 can selectively use the external memory 15 and the built-in DRAM 147 in two ways, as shown below.

First, as shown in FIG. 3, there is the method of allocating a memory area MA1 to the built-in memory (DRAM) 147 and simply allocating the external memory 15 as a memory area MA2 for a memory space (address) exceeding the memory area MA1 of the built-in memory 147.

In this case, by making good use of the advantages of the processing speed and reaction speed of the built-in memory 147, for example, data frequently requiring access are stored in the memory area MA1 of the built-in memory 147, and data having a small access frequency (not requiring access so much) are stored in the memory area MA2 of the external memory 15.

The memory I/F circuit 144 accesses the stored data of the built-in memory 147 prior to the stored data of the external memory 15.

Second, there is the method of flexibly switching and using areas of the external memory 15 and the built-in memory 147 with each other as shown in FIG. 4 and FIG. 5.

Due to the restriction and the like of the chip size, the external memory 15 can have a much larger capacity than the built-in memory 147.

Therefore, in the second method, the functions of dividing the external memory 15 into several blocks, similarly dividing the built-in memory into blocks of the same capacities as those of those blocks, and flexibly displacing these by a command from the main processor 11 are imparted to the memory I/F circuit 144, whereby the memory system may be administered more efficiently.

For example, the address spaces of the built-in memory 147 and the data stored there are assumed to be as shown in FIG. 4A.

Specifically, assuming that the built-in memory 147 is divided into four blocks of the area "01" to the area "04", data "0A" is stored in the area "01", data "0B" is stored in the area "02", data "0C" is stored in the area "03", and data "0D" is stored in the area "04".

Then, the address spaces of the external memory 15 and the data stored there are assumed to be as shown in FIG. 4B.

Specifically, assuming that the external memory 15 is divided into eight blocks of the area "11" to the area "18", data "1A" is stored in the area "11", data "1B" is stored in the area "12", data "1C" is stored in the area "13", data "1D" is stored in the area "14", data "1E" is stored in the area "15", data "1F" is stored in the area "16", data "1G" is stored in the area "17", and data "1H" is stored in the area "18".

Here, at the time of system operation, in the rendering circuit 14, the data "0A", "0B", "0C", and "0D" stored in the areas "01" to "04" of the built-in memory 147 are used for the rendering.

Next, an explanation will be made of the case where the data "1E" becomes necessary as the flow of the processing. In this case, an instruction for reading the data "1E" from the area "15" of the external memory 15 and transferring the same to the area "02" for storing the data which becomes unnecessary, for example, the data "0B" among the areas "01" to "04", is issued from the main processor 11 to the memory I/F circuit 144.

The memory I/F circuit 144 immediately transfers the data and prepares for the necessity of the data "1E".

The contents of the built-in memory 147 and the external memory 15 become as shown in FIGS. 5A and 5B. Namely, "1E" is stored in place of the data "0B" in the area "02" of the built-in memory 147, the area "02" of this built-in memory 147 is accessed, and the data "1E" is provided for the required processing.

DDA Set-up Circuit 141

Before the succeeding triangle DDA circuit 142 linearly interpolates the values of the vertexes of a triangle in a physical coordinate system to obtain information of the color and depth of pixels inside the triangle, the DDA set-up circuit 141 performs the set-up operation for obtaining the difference with a side of the triangle in the horizontal direction, etc. for the data (z, R, G, B, s, t, q) indicated by the polygon rendering data S11.

Specifically, this set-up operation uses values of a starting point and an end point and the distance between the starting point and the end point to calculate the change of values being sought in the case of movement by a unit length.

The DDA set-up circuit 141 outputs the calculated change data S141 to the triangle DDA circuit 142.

Figure 6:
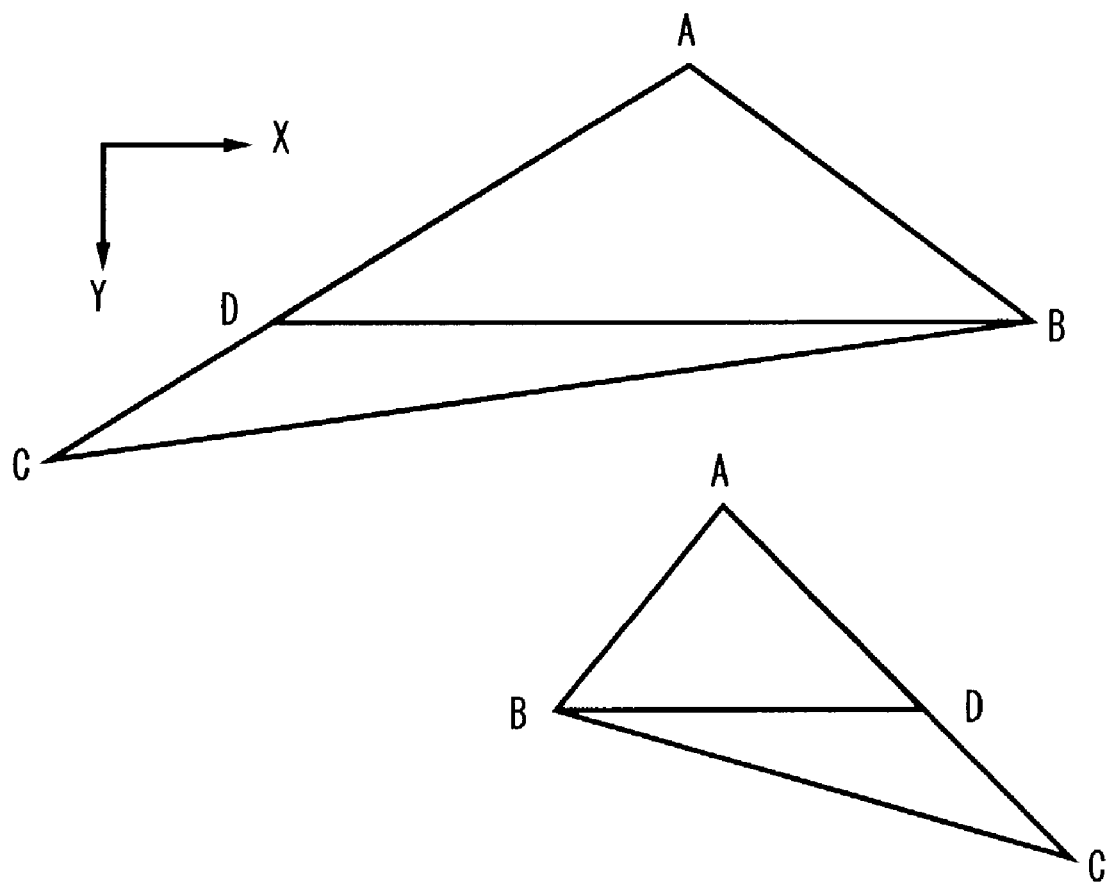
FIG. 6 is a view for explaining the function of a DDA set-up circuit according to the present invention.

The function of the DDA set-up circuit 141 will be further explained with reference to FIG. 6.

As explained above, the main processing of the DDA set-up circuit 141 obtains the change inside a triangle composed of three vertexes given various information (color and texture coordinates) at vertexes reduced to physical coordinates through previous geometric processing so as to calculate basic data for the later linear interpolation.

Note that the data of each vertex of the triangle is, for example, configured by 16 bits of x- and y-coordinates, 24 bits of the z-coordinate, 12 bits (=8+4) of the color values for the RGB, and 32 bits of floating decimal values (IEEE format) of the s, t, q texture coordinates.

While the drawing of a triangle is reduced to the drawing of a horizontal line, this makes it necessary to obtain the starting values at the starting point of the drawing of the horizontal line.

In drawing the horizontal line, the direction of drawing is made constant in one triangle. For example, when drawing it from the left to the right, the X with respect to displacement in the Y direction at a side on the left and the above various changes are calculated first, then these are used to find the x-coordinate of the leftmost point when moving from a vertex to the next horizontal line and values of the above various information (points on a side change in both the x- and y-directions, so calculation is impossible only from the gradient of the Y direction).

Only the position of the end point is required for the side on the right, so only the change of x with respect to the displacement in the Y direction needs to be investigated.

Regarding the drawing of a horizontal line, since the gradient in the horizontal direction is uniform in the same triangle, the gradients of the above various information are calculated.

The given triangle is sorted in the Y direction and the uppermost point is set to be A. Next, the remaining two vertexes are compared in terms of the positions in the X direction and the point on the right is set to be B. By doing this, the processing can be divided into only two or so steps.

Triangle DDA Circuit 142

The triangle DDA circuit 142 uses the change data S141 input from the DDA set-up circuit 141 to calculate the linearly interpolated (z, R, G, B, s, t, q) data for each pixel inside the triangle.

The triangle DDA circuit 142 outputs the data (x, y) for each pixel and the (z, R, G, B, s, t, q) data at the (x, y) coordinates to the texture engine circuit 143 as the DDA data (interpolated data) S142.

For example, the triangle DDA circuit 142 outputs the DDA data S142 of the 8 (=2×4) pixels positioned inside a block being processed in parallel to the texture engine circuit 143.

Figure 7:
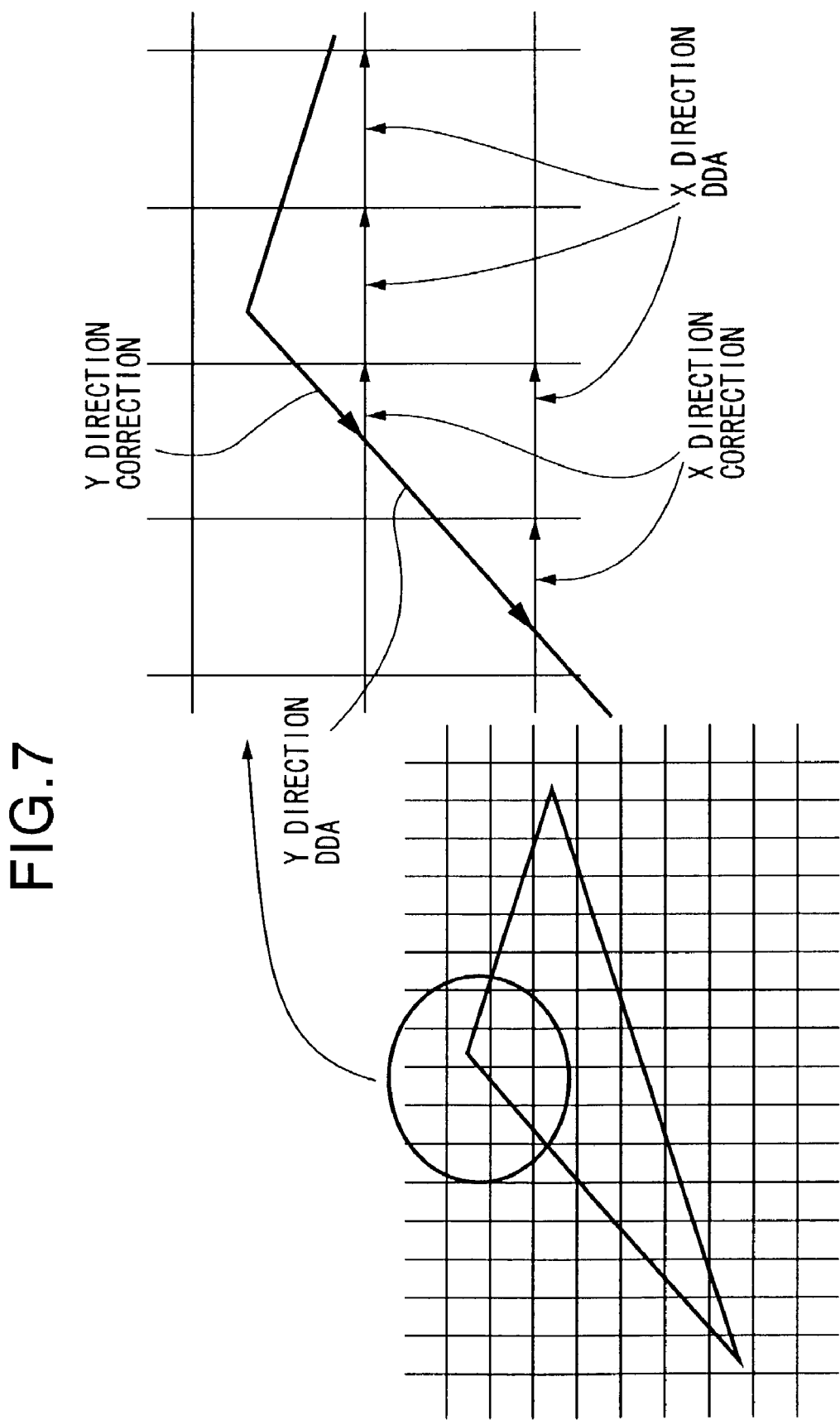
FIG. 7 is a view for explaining the function of a triangle DDA circuit according to the present invention.

A further explanation will be made next of the function of the triangle DDA circuit 142 with reference to FIG. 7.

As explained above, gradient information of the above various information of the sides and horizontal direction of a triangle is prepared by the DDA set-up circuit 141. The basic processing of the triangle DDA circuit 142 receiving this information comprises the calculation of the initial values of the horizontal line by interpolation of the various information of the sides of the triangle and the interpolation of the various information on the horizontal line.

Here, what must be noted most is that the calculation of the interpolation result requires calculation of the values at the center of a pixel.

The reason is that if the value calculated is off from the center of the pixel, while there is not much to worry about in the case of a still picture, the flickering of the image will become noticeable in a moving picture.

The various information at the leftmost side of a first horizontal line (naturally, the line connecting the centers of pixels) can be obtained by multiplying the gradient on the side with the distance from the vertex to the first horizontal line.

The various information at the starting point of the next line can be calculated by adding the gradient of the side.

The value at the first pixel of the horizontal line can be calculated by adding the value obtained by multiplying the distance to the first pixel with the gradient in the horizontal direction to the value at the starting point of the line. The value at the next pixel of the horizontal line can be calculated by adding to the first pixel value the gradient in the horizontal direction successively.

Next, sorting of vertexes will be explained with reference to FIG. 8.

By sorting the vertexes in advance, the branching of the successive processing can be reduced to a minimum and contradictions can be made harder to occur inside one triangle as much as possible, even in interpolation.

As the method of sorting, first, all of the vertexes supplied are sorted in the Y direction and the uppermost point and the lowermost point are defined as the point A and the point C, respectively. The remaining point is defined as the point B.

By doing so, in the processing, the side extending the longest in the Y direction becomes a side AC. First, the side AC and the side AB are used for the interpolation of the region between the two sides, and then interpolation is performed for the region between the side BC and the side AC, that is, leaving the side AC as it is and changing from the side AB. Further, it will be understood that it is sufficient to perform processing with respect to the side AC and the side BC for correction on the pixel coordinate lattice in the Y direction.

Since branching of the processing after sorting becomes unnecessary in this way, the processing can be performed by simply supplying the data, bugs can be prevented from occurring, and the configuration becomes simple.

Further, since the direction of the interpolation in one triangle can be made constant by setting a starting point on the side BC, the direction of interpolation (span) in the horizontal direction becomes constant, and any processing errors which occur are accumulated from the side BC to the other sides. Since the direction of the accumulation becomes constant, errors between adjacent sides become less conspicuous.

Next, the calculation of the gradient in the horizontal direction will be explained with reference to FIG. 9.

The gradient (variable) of the variables (x, y, z, R, G, B, s, t, q) inside a triangle with respect to (x, y) becomes constant due to the linear interpolation.

Accordingly, the gradient in the horizontal direction, that is, the gradient on each of the horizontal lines (span), becomes constant for all spans, so the gradient is obtained prior to the processing of the spans.

As a result of sorting the given vertexes of the triangle in the Y direction, the side AC is defined again to be the longest extending side, so there is always a point of intersection of a line extending from the vertex B in the horizontal direction and the side AC. This point is defined as D.

After this, by just obtaining the change between the point B and D, the gradient in the horizontal direction, that is, in the x-direction, can be obtained.

Specifically, the x- and z-coordinates at the point D become as shown in the equations below;

$$x_d = \{(y_d - y_a)/(y_c - y_a)\} \cdot (x_c - x_a)$$

$$z_d = \{(y_d - y_a)/(y_c - y_a)\} \cdot (z_c - z_a) \quad (1)$$

When obtaining the gradient of the variables z in the x-direction based on this, the following is obtained:

$$\begin{aligned}\Delta z / \Delta x &= (z_d - z_b)/(x_d - x_b) \\ &= [\{(y_d - y_a)/(y_c - y_a)\} \cdot (z_c - z_a) - z_b] \\ &\quad /[\{(y_d - y_a)/(y_c - y_a)\} \cdot (x_c - x_a) - x_b] \\ &= \{z_b(y_c - y_a) - (z_c - z_a)(y_c - y_a)\} \\ &\quad /\{x_b(y_c - y_a) - (z_c - z_a)(y_c - y_a)\}\end{aligned}$$

Figure 10A:
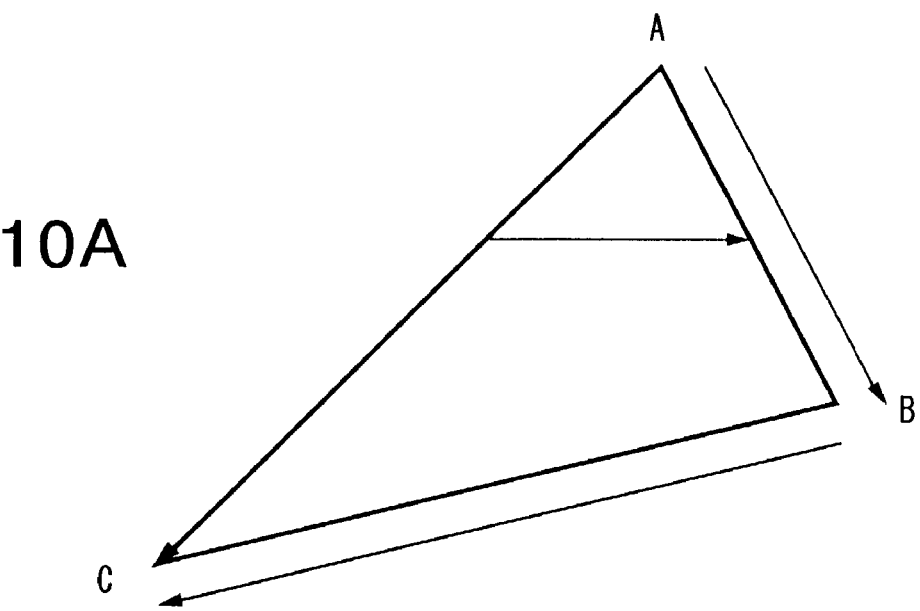
FIGS. 10A and 10B are views for explaining a routine for interpolation of vertex data of the triangle DDA circuit according to the present invention.
Figure 10B:
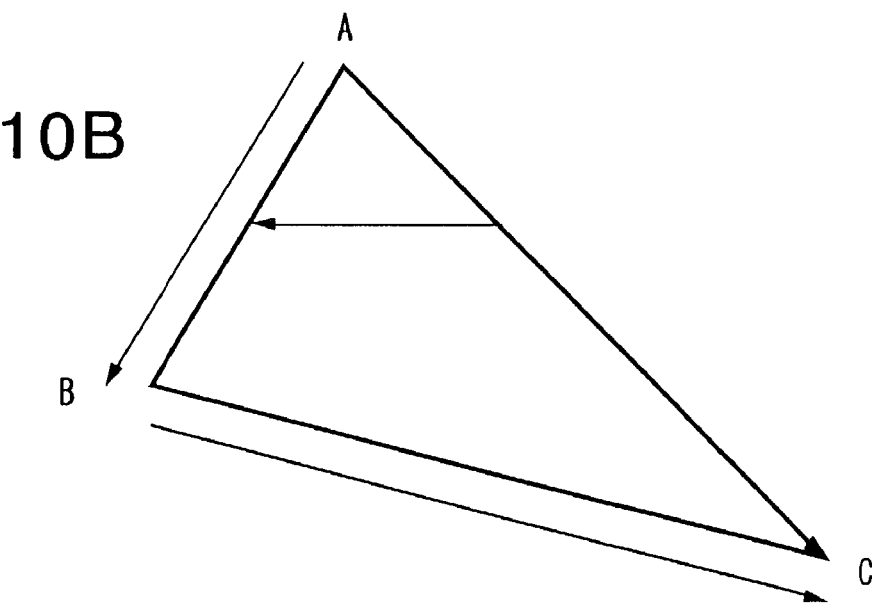
Figure 12:
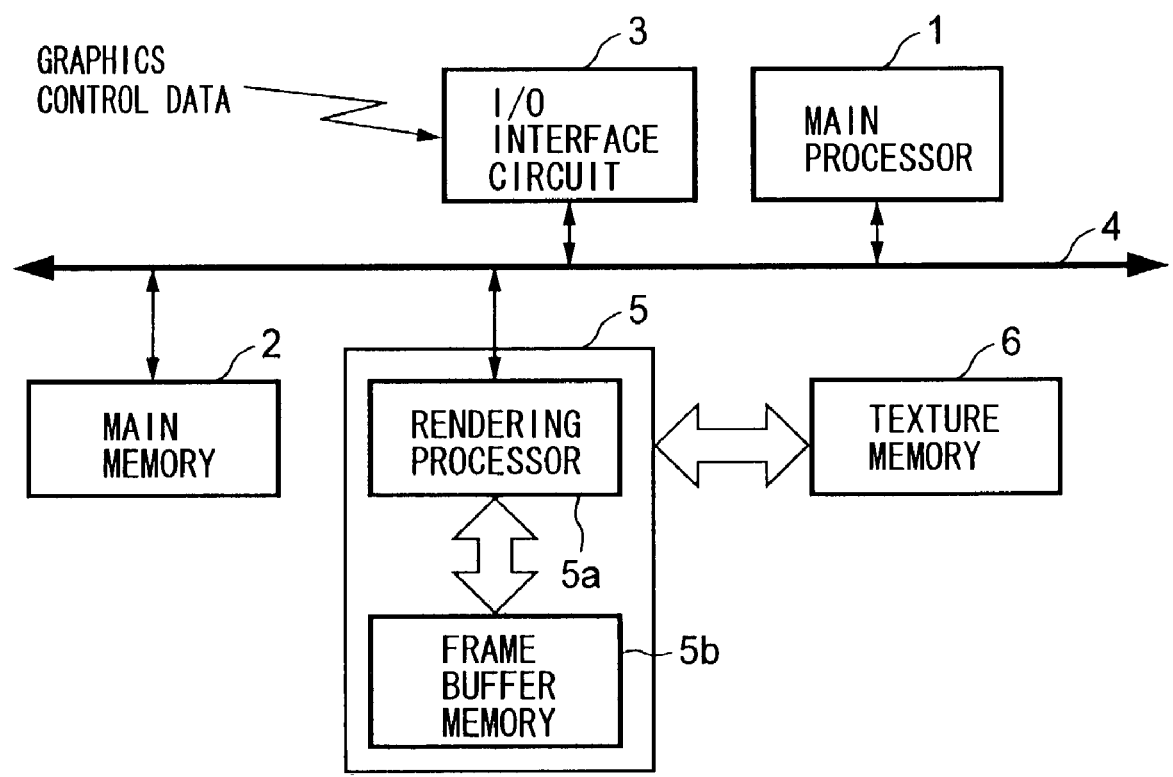
FIG. 12 is a view of the system configuration showing the basic concept of a three-dimensional computer graphics system.

Next, an example of the routine for interpolation of vertex data will be explained with reference to FIG. 10 and FIG. 11.

After the processing for sorting the vertexes, calculating the gradient in the horizontal direction, and calculating the gradient at each of the sides, interpolation is carried out using the results.

Depending on the position of the point B, the processing at a span splits in two directions. This is because it is desired to perform the processing by always using the side extending the longest in the Y direction as a starting point, so as to try to prevent trouble as much as possible by making the direction of accumulation of errors between spans in interpolation inside one triangle constant.

When the point B is at the same height as the point A, the first half of the processing is skipped. Therefore, the processing can be streamlined by just providing a skippable mechanism rather than branching.

When trying to improve the processing capability by simultaneously processing a plurality of spans, it is desired to obtain the gradient in the Y direction; however, it is necessary to carry out the processing again from the sorting of the vertexes. However, the processing before the interpolation is enough, so the processing system as a whole becomes simpler.

Specifically, when the point B is not the same height as the point A, Y direction correction of AC and AB (calculation of values on a pixel lattice) is performed (ST1 and ST2) and the interpolation on the side AC and the interpolation on the side AB are performed (ST3).

Then, the correction in the AC horizontal direction and the interpolation on the horizontal line (span) from the side AC in the side AB direction are carried out (ST4).

The above processing of steps ST3 and ST4 is performed until the end of the side AB (ST5).

When the processing of steps ST2 to ST4 until the end of the side AB is completed or when it is judged at step ST1 that the point B is the same height as the point A, the Y direction correction of BC (calculation of values on the pixel lattice) is carried out (ST6) and the interpolation on the side AC and the interpolation on the side BC are carried out (ST7).

Then, the correction in the AC horizontal direction and the interpolation on the horizontal line (span) in the direction from the side AC to the side BC are carried out (ST8).

The processing of the above steps ST7 and ST8 is carried out until the end of the side BC (ST9).

Texture Engine Circuit 143

The texture engine circuit 143 performs the calculation of "s/q" and "t/q", the calculation of the texture coordinate data (u, v), and the reading of the (R, G, B) data from the texture buffer 147a in order in a pipeline format.

Note that the texture engine circuit 143 performs processing on the 8 pixels positioned inside a predetermined block simultaneously in parallel.

The texture engine circuit 143 performs the operation for dividing the data s by the data q and the operation for dividing the data t by the data q on the (s, t, q) data indicated by the DDA data S142.

The texture engine circuit 143 is provided with, for example, eight division circuits, not illustrated, and performs the division "s/q" and "t/q" simultaneously on the 8 pixels.

Further, the texture engine circuit 143 respectively multiplies the texture sizes USIZE and VSIZE with the division results "s/q" and "t/q" to generate the texture coordinate data (u, v).

Also, the texture engine circuit 143 outputs a read request including the generated texture coordinate data (u, v) to the SRAM 148 or DRAM 147 via the memory I/F circuit 144. The texture engine circuit 143 obtains the (R, G, B) data S148 stored at the texture address corresponding to the (s, t) data by reading the texture data stored in the SRAM 148 or in the texture buffer 147a via the memory I/F circuit 144.

Here, the texture data stored in the texture buffer 147a is stored in the SRAM 148, as explained above.

The texture engine circuit 143 generates pixel data S143 by multiplying, etc. the (R, G, B) data in the read (R, G, B) data S148 and the (R, G, B) data included in the DDA data S142 from the former triangle DDA circuit 142.

The texture engine circuit 143 outputs the pixel data S143 to the memory I/F circuit 144.

Note that in the texture buffer 147a, MIPMAP (texture for a plurality of resolutions) and other texture data corresponding to a plurality of reducing rates are stored. Here, which reducing rate texture data to use is determined in the above triangular units using a predetermined algorithm.

In the case of a full color mode, the texture engine circuit 143 directly uses the (R, G, B) data read from the texture buffer 147a.

In the case of an index color mode, the texture engine circuit 143 reads a color look-up table (CLUT), prepared in advance, from the texture CLUT buffer 147d, transfers and stores the same in the built-in SRAM, and uses the color look-up table to obtain the (R, G, B) data corresponding to the color index read from the texture buffer 147a.

CRT Control Circuit 145

The CRT control circuit 145 generates an address for display on a not shown CRT in synchronization with given horizontal and vertical synchronization signals and outputs a request for reading the display data from the display buffer 147b to the memory I/F circuit 144. In response to this request, the memory I/F circuit 144 reads a certain amount of the display data from the display buffer 147b. The CRT controller circuit 145 has a built-in first-in first-out (FIFO) circuit for storing the display data read from the display buffer 147b and outputs the index value of RGB to the RAMDAC circuit 146 at certain time intervals.

RAMDAC Circuit 146

The RAMDAC circuit 146 stores the R, G, B data corresponding to the index values. It transfers R, G, B data of a digital format corresponding to the index value of RGB input from the CRT controller circuit 145 to a not illustrated digital/analog (D/A) converter to generate R, G, B data of an analog format. The RAMDAC circuit 146 outputs the generated R, G, B data to the not illustrated CRT.

Next, the overall operation of the three-dimensional computer graphics system in FIG. 1 will be explained.

In the three-dimensional computer graphics system 10, data for drawing graphics, etc. are supplied from the main memory 12 of the main processor 11 or from the I/O interface circuit 13, which receives graphics data from the outside, to the rendering circuit 14 via the main bus 16.

Note that the data for drawing graphics, etc. are, in accordance with need, subjected to coordinate conversion, clipping, lighting, and other geometric processing in the main processor 11, etc.

The graphics data after the geometric processing becomes polygon rendering data S11 composed of the coordinates x, y, z of the three vertexes of a triangle, the luminance values R, G, B, the texture coordinates s, t, q corresponding to the pixel to be drawn, etc.

The polygon rendering data S11 is input to the DDA set-up circuit 141 of the rendering circuit 14.

In the DDA set-up circuit 141, change data S141 indicating the difference of a side of the triangle from a horizontal direction etc. is generated based on the polygon rendering data S11. Specifically, the change, that is, the amount of change of the values to be obtained in the case of movement by a unit length, is calculated by using the value of the starting point, the value of the end point, and the distance between the two and output to the triangle DDA circuit 142 as change data S141.

In the triangle DDA circuit 142, the change data S141 is used for calculation of the linearly interpolated data (z, R, G, B, s, t, q) of each of the pixels inside the triangle.

Then, the calculated (z, R, G, B, s, t, q) data and the (x, y) data of each of the vertexes of the triangle are output from the triangle DDA circuit 142 to the texture engine circuit 143 as DDA data S142.

In the texture engine circuit 143, the operation for dividing the data s by the data q and the operation for dividing the data t by data q are performed for the (s, t, q) data indicated by the DDA data S142. Then, the texture sizes USIZE and VSIZE are respectively multiplied with the division results "s/q" and "t/q" to generate the texture coordinate data (u, v).

Next, a read request including the generated texture coordinate data (u, v) is output from the texture engine circuit 143 to the SRAM 148 via the memory I/F circuit 144, and the (R, G, B) data S148 stored in the SRAM 148 is read via the memory I/F circuit 144.

Next, in the texture engine circuit 143, the (R, G, B) data in the read (R, G, B) data S148 and the (R, G, B) data included in the DDA data S142 from the triangle DDA circuit 142 in the former stage are multiplied to generate the pixel data S143.

This pixel data S143 is output from the texture engine circuit 143 to the main memory I/F circuit 144.

In the case of a full color mode, the (R, G, B) data read from the texture buffer 147a can be directly used, while in the case of an index color mode, data in the color look-up table (CLUT), prepared in advance, is transferred from the texture CLUT buffer 147d to a buffer for temporary storage, which is configured by an SRAM, etc. By using the CLUT of the temporary storage buffer, the actual R, G, B colors can be obtained from the color index.

Note that when the CLUT is configured by an SRAM, when a color index is input to an address of the SRAM, the actual R, G, B colors are output.

In the memory I/F circuit 144, the z-data corresponding to the pixel data S143 input from the texture engine circuit 143 and the z-data stored in the z-buffer 147*c* are compared for judging whether the image drawn by the input pixel data S143 is positioned closer to the viewing point than the image written in the display buffer 21 the previous time.

When it is judged that the image drawn by the input pixel data S143 is positioned closer, the z-data stored in the z-buffer 147*c* are replaced by the z-data corresponding to the image data S143.

Next, in the memory I/F circuit 144, the (R, G, B) data are written in the display buffer 147*b*.

In the memory I/F circuit 144, the memory block storing the texture corresponding to the texture address of the pixel to be drawn is calculated from the texture address, a read request is made only to the memory block, and the texture data are read.

In this case, since there is no access for reading texture in memory blocks which do not store the corresponding texture data, it is possible to provide more time for access for drawing.

In the same way for drawing, a memory block storing pixel data corresponding to a pixel address to be drawn is accessed to read the pixel data from the corresponding address for modify writing, the data are modified, and then they are written back to the same address.

When performing hidden plane processing, again in the same way, a memory block storing depth data corresponding to a pixel address to be drawn is accessed to read the depth data from the corresponding address for modify writing, the data are modified if necessary, and then they are written back to the same address.

In such a transfer of data with the DRAM 147 and external memory 15 based on the memory I/F circuit 144, the drawing performance can be improved by performing the processing up to here in parallel.

Especially, a plurality of pixels can be simultaneously calculated by the means of partially increasing the operating frequency by providing the triangle DDA circuit 142 and the texture engine 143 portions in the same circuit in a parallel execution mode (spatial parallel) or by inserting a lot of pipelines (time parallel).

In the transfer of the data with the DRAM 147 and the external memory 15 based on the memory I/F circuit 144, for example, when certain data stored in the built-in DRAM 147 becomes unnecessary, and the displacement command is issued from the main processor 11 with respect to the memory I/F circuit 144, the data which become unnecessary among the data stored in the built-in DRAM 147 are displaced with the data needed next stored in the predetermined block of the external memory 15.

Then, the data which become necessary newly stored in the built-in DRAM 147 are accessed by the memory I/F circuit 144.

Further, the pixel data are arranged so that the adjacent portions in the display region are in different DRAM modules under the control of the memory I/F circuit 144.

Due to this, the processing is carried out simultaneously on a plane when drawing a plane such as a triangle. Therefore, the probability of operation of the DRAM modules is quite high.

When displaying an image on a not illustrated CRT, the CRT control circuit 145 generates the display address in synchronization with the given horizontal and vertical synchronization frequencies and sends a request for transferring the display data to the memory I/F circuit 144.

The memory I/F circuit 144, in accordance with a request, transfers a certain amount of the display data to the CRT control circuit 145.

The CRT control circuit 145 stores the display data in a not illustrated display use first-in first-out (FIFO), etc. and transfers index values of RGB to the RAMDAC 146 at certain intervals.

The RAMDAC 146 stores the RGB values with respect to RGB indexes inside the RAM and transfers the RGB values with respect to the index values to a not illustrated D/A converter.

Then, the RGB signal converted into an analog signal by the D/A converter is transferred to the CRT.

As explained above, according to the present embodiment, since a DRAM for storing image data and a logic circuit are accommodated on the same semiconductor chip, then the external memory 15 is additionally provided, the capacity of the external memory 15 is set larger than the capacity of the built-in memory 147, the memory area of the external memory 15 is divided into a plurality of blocks and the predetermined data are stored in each of the blocks, the memory area of the built-in memory 147 is divided into blocks each having the same capacity as that of the divided block of the external memory 15, the memory I/F circuit 144 displaces the data which become unnecessary among the data stored in the built-in memory with the data to be needed next stored in the predetermined block of the external memory when certain data stored in the built-in memory become unnecessary and the displacement command is issued, and the data which become necessary newly stored in the built-in memory 147 are accessed by the memory I/F circuit 144, so not only can the capacity be greatly increased, but also the advantages of the built-in memory of fast processing speed and reaction speed can be sufficiently exhibited.

Namely, since the advantages of the built-in memory 147 and the external memory 15 are provided together, the system can be efficiently administered, and a three-dimensional graphics system of a high processing capability can be constructed at a low cost by using the external memory of the optimum capacity corresponding to the system.

Further, since the DRAM 147 built inside the semiconductor chip is configured to store display data and texture data required by at least one graphic element, it becomes possible to store the texture data in a portion other than a display region. Thus, the built-in DRAM can be used effectively, and an image processing apparatus capable of attaining both a high speed processing operation and a low power consumption can be realized.

Further, a single memory system can be realized, and processing can be performed by just built-in components. As a result, there is a large paradigm shift as architecture.

Further, since the memory can be used efficiently, processing only by the DRAM provided therein becomes possible, and the large bandwidth between the memory and the drawing system due to the internal provision can be sufficiently utilized. Further, special processing can be built into the DRAM.

Furthermore, since display elements at adjacent addresses are arranged so as to be stored in different DRAM blocks in a display address space, bit lines can be used further effectively. When there are a large number of accesses to a relatively fixed display region, as in the drawing of graphics, the probability that the modules can simultaneously perform processing increases, and the drawing performance can be improved.

Further, since the indexes in index color and color look-up table values therefore are stored inside the built-in DRAM 147 to enable storage of more texture data, compression of the texture data becomes possible and the built-in DRAM can be effectively used.

Further, since the depth information of an object to be drawn is stored in the built-in DRAM, hidden plane processing can be performed simultaneously and in parallel with drawing.

Normally, a graphic is drawn and then displayed, but it is also possible not to use it directly for display, but to use the drawn data as texture data because the texture data and display data can be stored in the same memory system as a unified memory.

The above is effective when preparing necessary texture data at a necessary time by drawing. This is also an effective function for preventing ballooning of the texture data.

Further, by building the DRAM in the chip, a high speed interface portion thereof is completed inside the chip, so it becomes unnecessary to drive an I/O buffer having a large additional capacity or an interconnection capacity between chips, so the power consumption becomes smaller compared with the case where a DRAM is not built in.

Accordingly, a framework enabling everything to be done in only one chip by using a variety of techniques is becoming necessary and essential for familiar digital equipment such as future portable data assistants.

Note that the present invention is not limited to the above embodiments.

Further, while a configuration using the SRAM 148 was explained as an example in the above three-dimensional computer graphics system 10 shown in FIG. 1, the configuration need not be provided with the SRAM 148.

Furthermore, in the three-dimensional computer graphics system 10 shown in FIG. 1, a case where geometric processing for generating polygon rendering data was performed in the main processor 11 was explained as an example, but this also may be performed in the rendering circuit 14.

Summarizing the effects of the invention, as explained above, according to the present invention, there are the advantages that an increase of the capacity can be achieved without causing a drop in performance and an increase in costs, and, consequently an improvement of the processing capability can be achieved.

While the invention has been described with reference to specific embodiments chosen for purpose of illustration, it should be apparent that numerous modifications could be made thereto by those skilled in the art without departing from the basic concept and scope of the invention.

What is claimed is:

1. An image processing apparatus, comprising:
   at least a built-in memory for storing image data, wherein said built-in memory is divided into at least four modules;
   an external memory for storing data regarding the image,
   a logic circuit provided on the same semiconductor chip as the built-in memory and performing predetermined processing on the image data based on the stored data of the built-in memory and/or external memory, and
   a memory interface circuit for controlling access of data between the built-in memory and external memory and the logic circuit, and arranging the data in the at least four modules of the built-in memory so that each adjacent pixel in a display region is stored in a different module of the at least four modules,
   wherein the capacity of the external memory is larger than the capacity of the built-in memory,
   the memory area of the external memory is divided into a plurality of blocks, predetermined data is stored in individual blocks, each having predetermined data stored in each of the blocks,
   the memory area of the built-in memory is divided into blocks each having the same capacity as a divided block of the external memory, and
   the memory interface circuit accesses the data stored in each divided block in the built-in memory and supplies the data to the logic circuit and further receives a displacement command and displaces data which becomes unnecessary among the data stored in the built-in memory with the data needed next stored in the predetermined blocks of the external memory.

2. An image processing apparatus as set forth in claim 1, wherein
   the built-in memory stores the data having high access frequency, and
   the memory interface circuit accesses the stored data of the built-in memory prior to the stored data of the external memory and supplies the data to the logic circuit.

3. An image processing apparatus for performing rendering by receiving polygon rendering data including three-dimensional coordinates (x, y, z), R (Red), G (Green), and B (Blue) data, homogeneous coordinates (s, t) of texture, and a homogeneous term q for vertexes of a unit graphic, comprising:
   a built-in memory for storing display data and texture data required by at least one graphic element, wherein said built-in memory is divided into at least four modules;
   a logic circuit provided with at least an interpolated data generation circuit for interpolating the polygon rendering data of the vertexes of the unit graphic to generate interpolated data of pixels positioned inside the unit graphic and a texture processing circuit for dividing the homogeneous coordinates (s, t) of texture included in the interpolated data by the homogeneous term q to generate "s/q" and "t/q", reading texture data by using a texture address corresponding to the "s/q" and "t/q", and performing processing to apply the texture data to a surface of graphic elements of the display data and accommodated with the built-in memory on a single semiconductor chip;
   an external memory for storing at least the data regarding the texture processing; and
   a memory interface circuit for controlling the access of the data between the built-in memory and external memory and the logic circuit, and arranging the data in the at least four modules of the built-in memory so that each adjacent pixel in a display region is stored in a different module of the at least four modules,
   wherein the capacity of the external memory is larger than the capacity of the built-in memory,
   the memory area of the external memory is divided into a plurality of blocks, predetermined data is stored in individual blocks,
   the memory area of the built-in memory is divided into blocks each having the same capacity as a divided block of the external memory, and
   the memory interface circuit accesses the data stored in each divided block in the built-in memory and supplies the data to the logic circuit and further receives a displacement command and displaces data which becomes unnecessary among the data stored in the built-in memory with the data needed next stored in the predetermined blocks of the external memory.

4. An image processing apparatus as set forth in claim 3, wherein the built-in memory stores the data having high access frequency, and the memory interface circuit accesses the stored data of the built-in memory prior to the stored data of the external memory and supplies the data to the logic circuit.

* * * * *